F. F. ELLIS.
SHAFT COLLAR.
APPLICATION FILED MAR. 22, 1910.
977,720.
Patented Dec. 6, 1910.
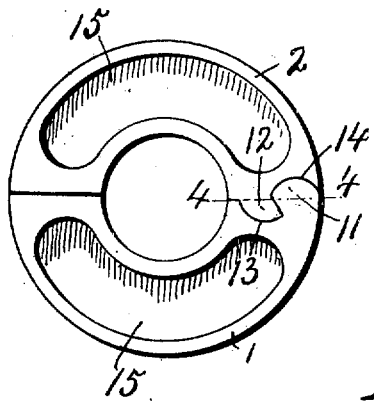
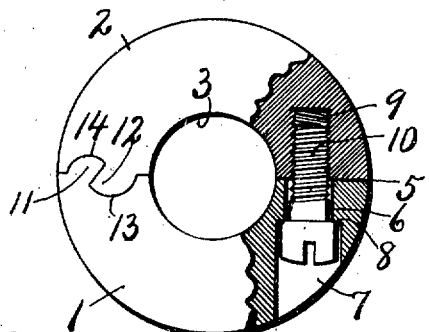
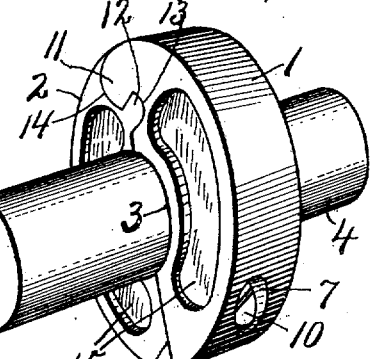
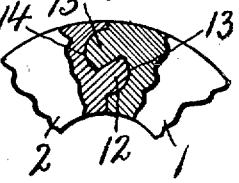
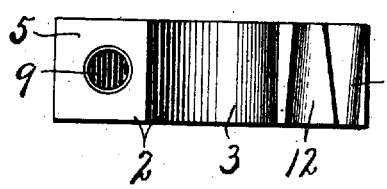
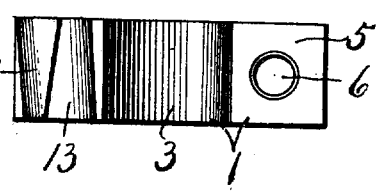

UNITED STATES PATENT OFFICE.

FERRAND F. ELLIS, OF ONEIDA, NEW YORK.

SHAFT-COLLAR.

977,720.      Specification of Letters Patent.      Patented Dec. 6, 1910.

Application filed March 22, 1910. Serial No. 550,931.

*To all whom it may concern:*

Be it known that I, FERRAND F. ELLIS, of Oneida, in the county of Madison, in the State of New York, have invented new and useful Improvements in Shaft-Collars, of which the following, taken in connection with the accompanying drawings, is a full, clear, and exact description.

This invention relates to certain improvements in sectional compression collars for shafting adapted to be placed upon any part of a shaft after the latter is installed in operative position for holding such shaft or its bearings or any pulley or other part which may be mounted on such shaft against axial movement.

One of the objects is to provide a shaft collar having a smooth circular periphery and substantially smooth sides free from set screws and other dangerous projections which are frequently the cause of serious accidents.

Another object is to enable the collar to be firmly clamped upon the shaft without the use of set screws or other fastening devices which invariably mutilate the shaft and often render the removal or shifting of the collar extremely difficult, if not impossible, without further injury to the shaft or collar.

A still further object is to provide the meeting faces of the collar sections with axially wedging interlocking members capable of holding the sections against radial separation when adjusted for use and at the same time permitting the interlocking members to be interlocked by slight relative axial movement of one or both sections.

Other objects and uses will be brought out in the following description.

In the drawings: Figure 1 is an end view of a compression collar embracing the features of my invention. Fig. 2 is an opposite end view partly in section showing the clamping screw for drawing the two parts together upon the shaft. Fig. 3 is a perspective view of the same collar as mounted upon a shaft showing particularly the chambers or recesses for receiving the lubricant. Fig. 4 is a sectional view taken on line 4—4, Fig. 1, showing the tapering interlocking members. Fig. 5 is a fragmentary end view partly in section of one side of the collar showing the interlocking ribs and grooves as they appear midway between the end faces. Figs. 6 and 7 are inner face views of the collar showing particularly the tapering ribs and grooves.

This collar comprises two substantially semi-circular sections —1— and —2— of machine steel or cast metal or other suitable material provided with centrally semi-circular shaft openings —3— for the reception of a shaft, as —4—. The meeting faces, as —5—, of the collar sections at one side of the opening are substantially flat, the section —1— being provided with a tangential bolt opening —6— at right angles to and opening from the adjacent flat meeting face —5— and having its outer end enlarged at —7— forming a shoulder —8—. The collar section —2— is provided with a threaded socket —9— alined with the bolt opening —6— and therefore at substantially right angles to the plane meeting face —5— but terminating within the periphery of said section. A bolt —10— is passed through the bolt opening —7— and engaged with threaded socket —9— and also with the shoulder —8— for drawing the two collar sections together upon the shaft.

The meeting faces of the opposite sides of the collar sections are provided respectively with transversely tapering ribs or flanges —11— and —12— and corresponding tapering grooves —13— and —14—, the groove of one section receiving the corresponding rib of the other section. The ribs —11— and —12— taper in opposite directions and the grooves also taper in opposite directions, but in the same direction as that of the ribs which they are adapted to receive, the cross sectional form of each rib and its corresponding groove being substantially the same at all points throughout their lengths and therefore they are the same dimensions midway between the ends of the collar.

In practice the distance transversely across the base of each rib and the distance transversely across the opening side of the corresponding groove is slightly less than the width transversely across the outer portion of the rib and inner portion of the groove, so that when the parts are assembled by axial sliding interlocking engagement they will be held against relative radial movement or displacement one from the other but may be disengaged by moving one or both parts axially relatively to each other less than half the thickness of the collar in the direction of taper of the inner rib.

When the collar is adjusted for use or clamped upon the shaft, the bolt —10— holds the sections against relative axial movement, sufficient clearance being left between the plane meeting faces around the bolt to permit the sections to be drawn against the shaft, the enlarged end of the bolt opening being of sufficient depth to permit the head of the bolt to lie wholly within the periphery of the collar, thereby leaving such periphery smooth and free from projections.

Both end faces of the collar are substantially parallel at least one side being provided with shallow recesses —15— for the reception of any suitable lubricant, the collar being reversible end for end on the shaft so as to bring the lubricant containing recess next to the bearing or other fixed part with which the collar may be associated, thereby lubricating the endthrust bearing faces between the collar and bearing.

In removing the collar from the shaft, it is simply necessary to remove clamping bolt —10— thereby releasing the collar sections from gripping the shaft and permitting one or both of said sections to be moved axially relatively to each other to disengage the interlocking ribs —11— and —12— from their respective grooves, it being understood that by constructing and assembling the collar upon the shaft in the manner described it is practically impossible for such collar to become set upon or to mutilate the shaft and at the same time it may be rigidly held in place and easily and quickly removed or shifted when necessary.

In shifting the collar from one position to another along the shaft, it is simply necessary to loosen the clamping-bolt —10— sufficiently to relieve the firm grip of the sections upon the shaft and when brought to the desired position may be again quickly and firmly reclamped to such shaft.

What I claim is:

1. A shaft collar comprising opposite substantially semi-circular sections having registering shaft openings, the meeting faces of the sections at one side of the shaft opening being provided respectively with a longitudinally tapering rib and a corresponding longitudinally tapering groove, the rib wedging axially of the collar in the groove, and a clamping bolt connecting the collar sections at the opposite sides of the shaft opening and lying wholly within the periphery of the collar.

2. A shaft collar comprising opposite circular half sections each section having its meeting face at one side of the shaft opening provided with a longitudinally tapering rib and a longitudinally tapering groove, such rib and groove tapering in opposite directions, the rib of one section having a wedging fit with the corresponding groove in the other section, and means at the opposite side of the shaft opening for drawing the sections toward each other.

In witness whereof I have hereunto set my hand on this 18th day of March 1910.

FERRAND F. ELLIS.

Witnesses:
H. E. Chase,
A. L. Humphrey.